J. H. CHAMP.
DEMOUNTABLE RIM.
APPLICATION FILED APR. 5, 1912.
1,061,816.
Patented May 13, 1913.
2 SHEETS—SHEET 1.
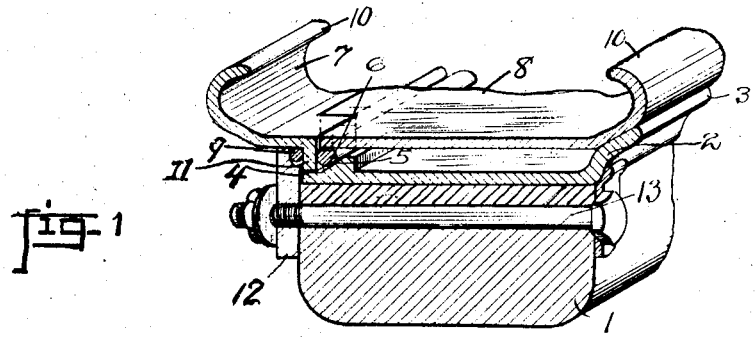
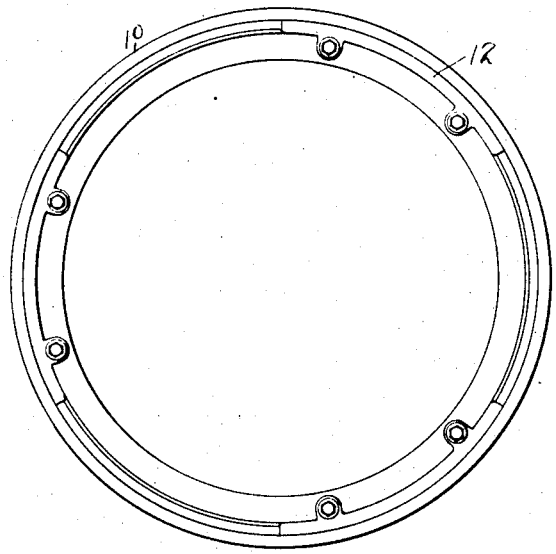
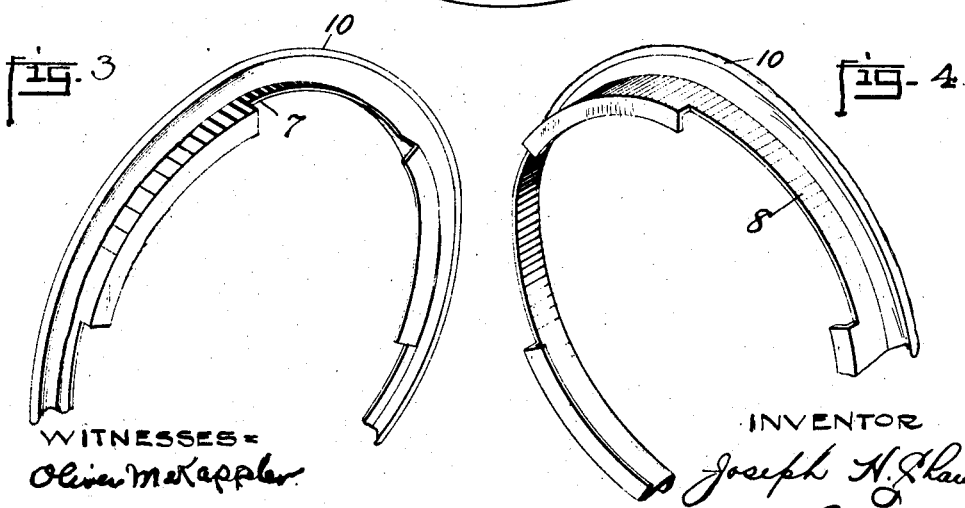
WITNESSES
INVENTOR
Joseph H. Champ
BY J. B. Fay
ATTORNEY

J. H. CHAMP.
DEMOUNTABLE RIM.
APPLICATION FILED APR. 5, 1912.

1,061,816.

Patented May 13, 1913.
2 SHEETS—SHEET 2.

WITNESSES:
Oliver M. Kappler
Jno. F. O'Brien

INVENTOR
Joseph H. Champ
BY J. B. Fay
ATTORNEY

UNITED STATES PATENT OFFICE.

JOSEPH H. CHAMP, OF CLEVELAND, OHIO, ASSIGNOR TO THE STANDARD WELDING COMPANY, OF CLEVELAND, OHIO, A CORPORATION OF OHIO.

DEMOUNTABLE RIM.

1,061,816.  Specification of Letters Patent.  Patented May 13, 1913.

Application filed April 5, 1912. Serial No. 688,574.

*To all whom it may concern:*

Be it known that I, JOSEPH H. CHAMP, a citizen of the United States, and a resident of Cleveland, county of Cuyahoga, and State of Ohio, have invented a new and useful Improvement in Demountable Rims, of which the following is a specification, the principle of the invention being herein explained and the best mode in which I have contemplated applying that principle, so as to distinguish it from other inventions.

The present invention relates to a demountable or removable rim for use on vehicle wheels, and furthermore comprises a construction which is particularly adapted for use with a certain type of divisible rim which is commonly known as the " quick detachable " type.

One object of the invention is to provide a removable rim which will not rust or stick even after long use, and for this purpose the means here provided include a removable bearing surface of the demountable or removable rim.

To the accomplishment of these and related ends, said invention, then, consists of the means hereinafter fully described and particularly pointed out in the claims.

The annexed drawings and the following description set forth in detail certain mechanism embodying my invention, such disclosed means constituting, however, but one of the various mechanical forms in which the principle of the invention may be used.

Figure 5:
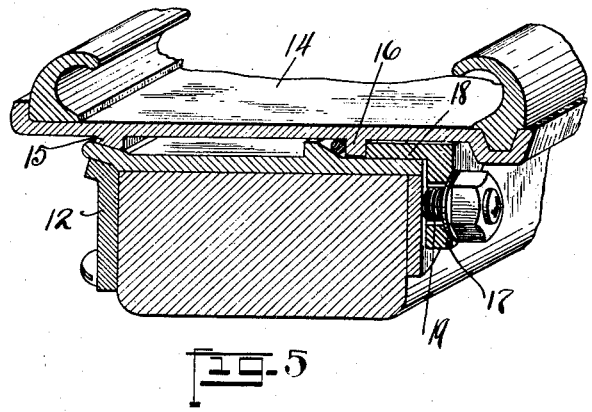
Figure 6:
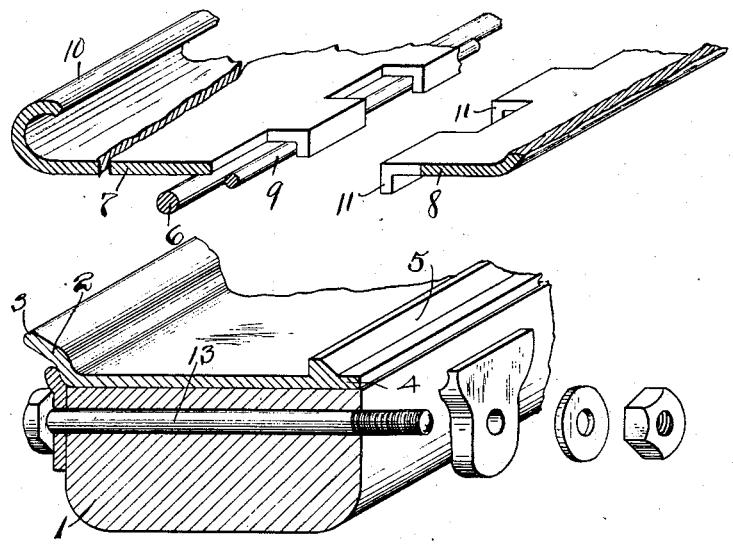

In said annexed drawings:—Figure 1 is a perspective view of a section through a vehicle wheel having my improved rim attached; Fig. 2 is a side view of such a wheel; Figs. 3 and 4 are views in perspective of the two parts of the divisible rim; Fig. 5 is a view similar to that in Fig. 1, but showing the demountable feature of my invention in combination with one of the more common types of divisible rims; Fig. 6 is a view in perspective of the parts of the divisible rim and felly, showing clearly their construction and the interlocking means.

In Fig. 1 there is shown the felly 1 of a wheel upon which there is mounted a fixed rim 2 having an up-turned bearing surface 3 at one side of the same and a depression 4 at the other side. Intermediate of the two, but adjacent to the depressed side of the rim, is an inclined bearing surface 5. A removable bearing surface 6, here illustrated as a split ring of circular cross section, is disposed in the depression 4 of the fixed rim.

A divisible rim which is adapted to removably engage the fixed rim is here shown as a longitudinally split rim having two parts 7 and 8, each of said parts having projecting right-angled lugs extending from their adjacent edges. The interlocking action of these lugs will be readily seen. As the two parts of the rim are brought together, the lugs being alternately disposed on the two, they are permitted to slide past each other, when a channel will be formed on the inner surface of the rim between the downwardly projecting portions of these two series of lugs. In this channel there is disposed a second split ring 9 which is adapted to hold the two parts of the divisible rim in engagement. This engagement will be secured by the pressure of the tire shoe against the up-turned rounded flanges 10 on the two parts of the divisible rim which will force these two parts away from each other when the downwardly projecting lugs will clamp the split ring between the same, thus forming a very secure engagement.

As the divisible rim is forced onto the fixed rim, the lugs 11 on the outer part of the divisible rim will engage the bearing member or split ring and will force the same up and onto the inclined bearing surface on the fixed rim. The divisible rim will also engage the fixed bearing surface 3 on the fixed rim, as will be readily understood, and the action of the lugs in forcing the split ring onto the inclined surface will make this ring function as a second bearing surface, thus supporting the divisible rim at two points spaced from each other. When the two parts of the divisible rim have been engaged, it will be noticed that alternate portions of the circumference of the rim will be opened, since the lugs on the inner member are alternately disposed. The means for retaining the divisible rim in engagement with the fixed rim are constructed to take advantage of these openings, and comprise members 12 which will snugly fit within these openings, thus pressing against the split ring which locks the two parts of the divisible rim together. Bolts 13 may be used for holding these members against the side of the felly and thus retaining the two rims in engagement. It will be noticed that by constructing my divisible rim of this type a part of the locking means for that rim may be made to obtain the action desired from the bearing surfaces of the fixed rim, but it is not, of course, necessary that the exact means here shown be used.

In Fig. 5 I have shown one of the more common types of divisible rims adapted with but slight change, viz., the addition of a flange, to serve in the same manner as does the divisible rim shown in my preferred construction. In this modified construction I use the same fixed and removable bearing surfaces and also an inclined surface to be contacted by the latter. The only change is in the divisible rim which comprises a rim proper 14 which has an inwardly extending flange or bearing surface 15 adapted to engage the fixed bearing surface on the fixed rim. A second inwardly extending flange 16 is so disposed that it will function as do the lugs in the previous construction and will force the split ring into bearing contact with the rim 14 and the inclined surface 5 when the divisible rim is forced onto the fixed rim. This is accomplished by means of the members 17 which have flanges 18 contacting the flange 16 on the divisible rim and forcing it onto the rim as will be readily understood. Bolts 19 may be used to retain the members 17 in engagement.

It will be understood that other suitable divisible rims may be used with my invention, although it is particularly adapted to use with the type illustrated in Figs. 1 and 6.

The advantages of the present construction are its simplicity in both structure and operation and the double function which certain parts are made to perform, thus keeping the weight at a minimum.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle wheel, the combination with a felly having a fixed rim thereon, and a removable rim adapted to receive a tire shoe; of a fixed bearing surface mounted on said fixed rim; an inclined face on said fixed rim spaced from said bearing surface; a removable bearing surface mounted on said fixed rim; means on said removable rim adapted, upon movement of said removable rim onto said fixed rim, to force said removable bearing member up said inclined face, whereby said removable bearing member and said fixed bearing member support said removable rim; and means for maintaining said removable rim in engagement.

2. In a vehicle wheel, the combination with a felly having a fixed rim thereon, and a removable rim adapted to receive a tire shoe; of a fixed bearing surface mounted on said fixed rim; an inclined face on said fixed rim spaced from said bearing surface; a removable bearing surface mounted on said fixed rim; depending lugs on the inner side of said removable rim adapted, upon movement of the same onto said fixed rim, to force said removable bearing member up said inclined face, whereby said removable bearing member and said fixed bearing member support said removable rim; and means for maintaining said removable rim in engagement.

3. In a vehicle wheel, the combination with a felly having a fixed rim thereon, and a removable rim adapted to receive a tire shoe; of a fixed bearing surface mounted on said fixed rim; a removable bearing surface comprising a split ring mounted on said fixed rim; an inclined face on said fixed rim; depending lugs on the inner side of said removable rim adapted, upon movement of the same onto said fixed rim, to force said removable bearing member up said inclined face, whereby said removable bearing member and said fixed bearing member support said removable rim; and means for maintaining said removable rim in engagement.

4. In a vehicle wheel, the combination with a felly having a fixed rim thereon, and a removable rim adapted to receive a tire shoe; of a fixed bearing surface mounted on said fixed rim; a removable bearing surface comprising a split ring mounted on said fixed rim; an inclined face on said fixed rim, said ring being adapted, when forced up said inclined surface, to act as a second bearing surface for said removable rim; depending lugs mounted on the inner side of said removable rim adapted upon movement of the same onto said fixed rim, to force said split ring up said inclined surface, whereby said removable bearing member and said fixed bearing member support said removable rim; and means adapted to actuate said removable rim to force said split ring into such bearing engagement, said means being also adapted to retain said removable rim on said fixed rim.

5. In a vehicle wheel, the combination with a felly having a fixed rim thereon, and a removable rim adapted to receive a tire shoe; of a fixed bearing surface mounted on said fixed rim; a removable bearing surface comprising a split ring mounted on said fixed rim; an inclined face on said fixed rim, said ring being adapted, when forced up said inclined surface, to act as a second bearing surface for said removable rim; depending lugs mounted on the inner side of said removable rim adapted upon movement of the same onto said fixed rim, to force said split ring up said inclined surface, whereby said removable bearing member and said fixed bearing member support said removable rim; a second split ring adapted to be placed laterally against said lugs on removable rim; and means adapted to engage said second ring and to actuate said removable rim to force said first-named split ring into such bearing engagement, said means being also adapted to retain said removable rim on said fixed rim.

Signed by me this 18th day of March, 1912.

JOSEPH H. CHAMP.

Attested by—
 F. L. HINDS,
 JOHN H. ROBERTS.